United States Patent [19]

Sweet

[11] Patent Number: 4,807,674
[45] Date of Patent: Feb. 28, 1989

[54] VACUUM CHAMBER SIPHON APPARATUS

[75] Inventor: Lyle F. Sweet, Greenville, Va.

[73] Assignee: Paul A. Braginetz, Staunton, Va.

[21] Appl. No.: 124,265

[22] Filed: Nov. 23, 1987

[51] Int. Cl.[4] ............................................. B65B 31/04
[52] U.S. Cl. .................................... 141/59; 137/205; 184/1.5
[58] Field of Search ....................... 141/59; 137/205; 184/1.5

[56] References Cited

U.S. PATENT DOCUMENTS 4,378,026  3/1983  Bauer ................................ 141/59 X Primary Examiner—William A. Cuchlinski, Jr.
Attorney, Agent, or Firm—Brady, O'Boyle & Gates

[57] ABSTRACT

Vacuum powered apparatus for removing a liquid, such as automatic transmission fluid, from a relatively inaccessible container such as the pan located on the underside of an automatic transmission of an automotive vehicle. The apparatus includes a blow molded plastic container of unitized construction which includes a pouring spout, a pair of nipples and handle formed along the parting line or seam of a pair of symmetrical cavities formed in two adjoining faces of a blow molding die set. A pair of elongated flexible hose elements is connected at one end to the container nipples while their other ends are respectively connected to a vacuum source such as the manifold vacuum fitting on the carburetor and into the automatic transmission reservoir via the filling tube therefor.

2 Claims, 1 Drawing Sheet

VACUUM CHAMBER SIPHON APPARATUS

BACKGROUND OF THE INVENTION

Field of the Invention

This invention relates generally to apparatus for withdrawing a liquid from a container and more particularly to vacuum powered apparatus for withdrawing transmission fluid from the transmission of a automotive vehicle or motor oil from its crankcase.

While various types of apparatus are known for withdrawing liquids from an inaccessible container and being powered from an external vacuum source, such apparatus has been relatively complex in their construction and require various types of clumsy containers, intricate valves, fasteners and clamps in their implementation.

It is an object of the present invention, therefore, to provide an improvement in siphoning apparatus.

It is another object of the invention to provide an improved type of vacuum powered siphoning apparatus.

It is a further object of the invention to provide an improvement in siphoning apparatus which is powered by the manifold vacuum of an internal combustion engine.

It is still another object of the invention to provide an improved siphoning apparatus which is of a unitized construction and relatively inexpensive to manufacture.

SUMMARY OF THE INVENTION

Briefly the foregoing and other objects of the invention are provided by a plastic container of unitized construction produced by a blow molding process within two symmetrical halves of a blow molding die set containing cavities conforming to the shape of the container. The container is of a generally rectangular configuration with a plurality of upwardly projecting elements located at the upper end thereof and including an angulated threaded pouring spout adjacent the outer edge for receiving a threaded cap, an inwardly located handle and a pair of upwardly extending nipples communicating with the interior of the container on either side of the handle, all being further located on the parting line or seam of the two halves of the container as defined by the die cavities. A pair of elongated flexible tubes or hoses are adapted to have one end thereof slip-fitted over the nipples with their opposite ends respectively coupled to a vacuum source and to the container from which liquid is to be extracted. In its preferred use, the vaccum source comprises a manifold vacuum fitting located on the body of a carburetor of an internal combustion engine while the container comprises the reservoir for automatic transmission fluid of an automotive vehicle and the liquid comprises the automatic transmission fluid located in the transmission.

DESCRIPTION OF THE DRAWINGS

The objects of the present invention and the attendant advantages thereof will become readily apparent by reference to the following drawings, wherein.

DETAILED DESCRIPTION OF THE INVENTION

Figure 1:
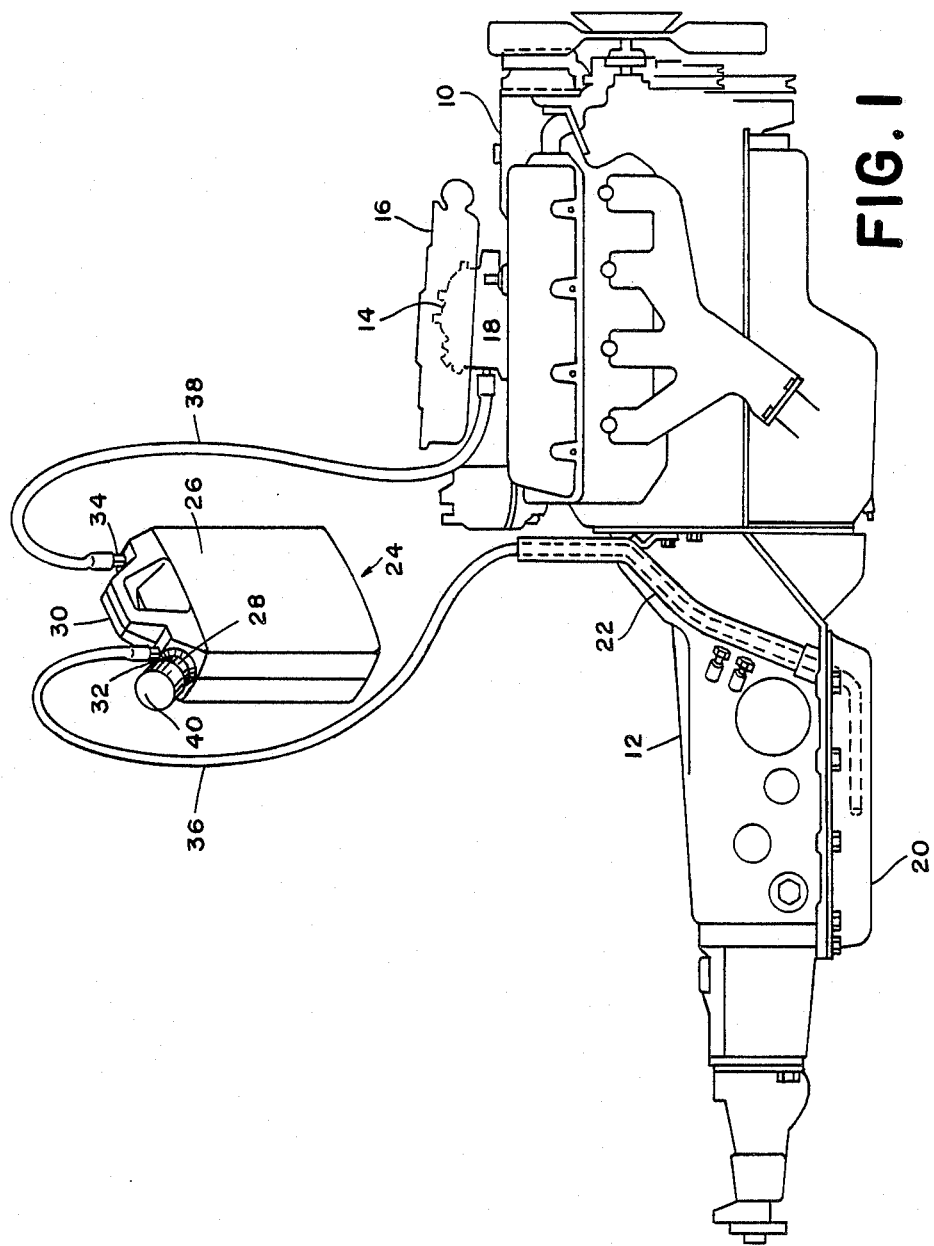
FIG. 1 is a diagram illustrative of vacuum powered apparatus according to the subject invention for removing automatic transmission fluid from the transmission of an automotive vehicle including an internal combustion engine.

Referring now to the drawings wherein like reference numerals refer to like components, reference will be made first to FIG. 1. Reference numeral 10 denotes a conventional internal combustion engine having an automatic transmission 12 coupled thereto in tandem. The engine 10, as shown, additionally includes a carburetor 14 which is typically covered by an air filter housing assembly 16. The carburetor 14 additionally has at least one external tubular fitting 18 coupled to the engine's manifold vacuum and to which a vacuum hose, not shown, is tyically attached for powering a vacuum powered device associated with the vehicle. The manifold vacuum present at the fitting 18 will be utilized to power the subject invention although, when desired, any other vacuum source can be used.

Further as shown in FIG. 1, the transmission 12 includes a pan 20 which is bolted onto the underside thereof and acts as a receptacle and reservoir for the automatic transmission fluid required for its operation. A generally verticle filling tube 22 is coupled to the pan 20 for replenishing the transmission fluid when desired. All of these elements are well known in the art.

While prior art practice has recognized that one can remove crankcase oil from an internal combustion engine by inserting a hose into the dip stick tube coupled to the crankcase by means of vacuum powered or electrically powered siphoning devices, the same has not been true with respect to transmission fluid.

This now leads to a consideration of the subject invention whose primary, but not only, objective is to remove the automatic transmission fluid from the transmission via the filling tube 22, as shown in FIG. 1, without dropping the pan 20. When desired, however, it can be used for removing oil from the crankcase of the engine 10.

The invention comprises a plastic container 24 of unitized construction which is easily and cheaply made by a "parison-mandrel" blow molding process, a process well known to those skilled in the art. The container 24 includes a generally rectangular body portion 26, a pouring spout 28, a handle 30 and a pair of upwardly extending hose fittings or nipples 32 and 34 which communicate to the interior of the container body 26 and which are adapted to receive the proximal ends of a pair of elongated flexible hoses 36 and 38, respectively. The hoses 36 and 38 are typically made of clear plastic material and have an inside diameter of, for example, 5/16 in. with the diameters of the nipples 32 and 34 being of substantially the same dimension so that a simple press-fit will be sufficient to install and maintain a snug and firm contact without the need for external clamps. The length of the hoses 36 and 38 are of sufficient length so that the container 24 can be placed, for example, on the ground adjacent a vehicle, not shown, containing the engine 10 and the transmission 12 and so that the opposite or distal end of the hose 36 can be inserted into the transmission filling tube 22 and extend down into the region of the pan 20, as shown in FIG. 1. The opposite end of the hose 38 is attached to the manifold vacuum fitting 18 located on the body of the carburetor 18.

In operation, a threaded cap 40 is first screwed onto the spout 28 to close and vacuum seal the container 24 and the hoses 36 and 38 are attached as shown in FIG. 1. The engine 10 is started and while running, the manifold vacuum of the engine 10 is applied to the interior of the container 24 via the hose 38 and transmission fluid will be drawn from the pan of the transmission through the hose 36 and into the body 26 of the container 24 as a result of the well known principle of siphoning. When the operation is complete, the hoses 36 and 38 are disconnected from both the engine 10 and the transmission 12. The collected used transmission fluid is later emptied from the container 24 via the spout 28.

Figure 2:
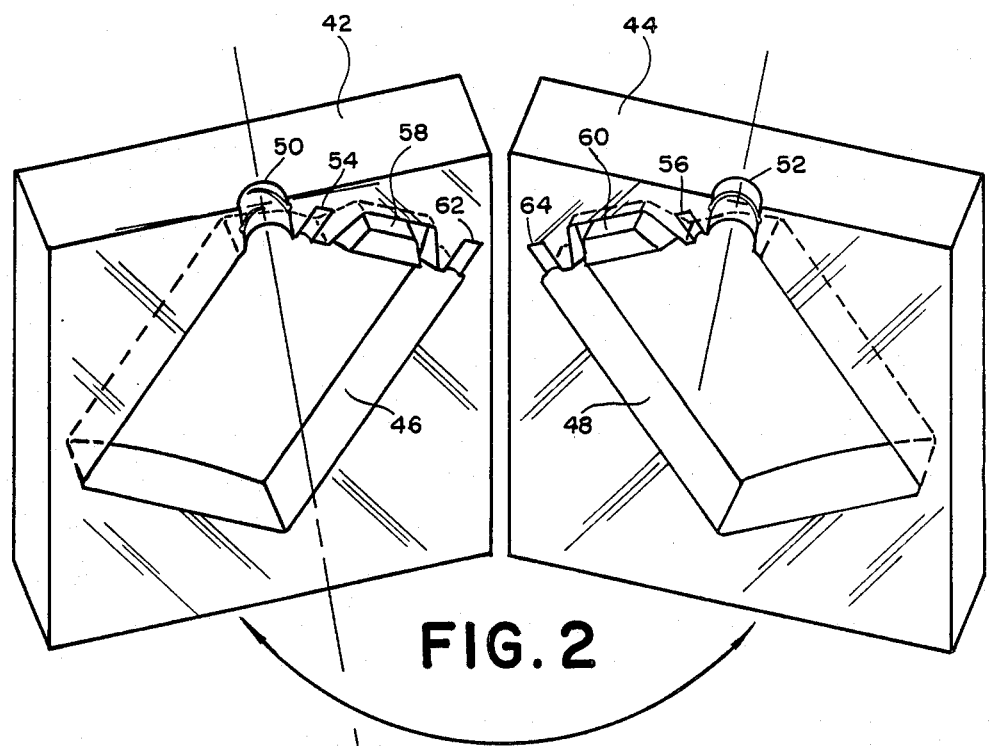
FIG. 2 is an exploded tri-metric projection of two halves of a blow molding die set, shown for illustration only, utilized for producing a container of the apparatus shown in FIG. 1.
Figure 3:
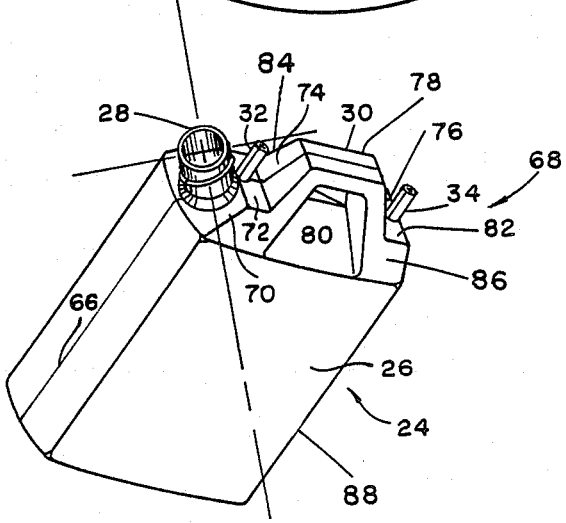
FIG. 3 is a tri-metric view of the unitized blow molded container produced by the die set shown in FIG. 2.

Referring now to FIGS. 2 and 3 disclosed thereat are further details of the container 24 as well as the manner in which it is constructed. In FIG. 2, there is disclosed a pair of die members 42 and 44 which comprise opposing symmetrical halves of a die set and which include respective cavities 46 and 48 configured to have the shape of one-half of the container 24 along a central longitudinal cross-section. The die set straddles an air blowing pairson-mandrel positioned thereat whereupon the die set closes on a suspended parison of plastic material when it reaches its intended length from the mandrel which is then nested in the extension of the opening in the die set, i.e. at 50 and 52 (FIG. 2).

With the two die members 42 and 44 placed in face-to-face relation, a composite interior cavity is provided which conforms to the shape of the container body 26. The dies 42 and 44 additionally include semi-circular bores 50 and 52 having threaded grooves formed therein for defining the spout 28 as shown in FIG. 3. The cavities 46 and 48 additionally include cavity portions 54 and 56 adjacent the bores 50 and 52 for defining the nipple 32. Next to the cavity portions 54 and 56 are a pair of cavity portions 58 and 60 which define the handle 30 and, lastly, a pair of cavity portions 62 and 64 identical to the cavity portions 54 and 56 define a cavity for the nipple 34.

When the blow molding process is completed and the container 24 removed therefrom, the nipples are opened and the residue is removed. There is a hairline 66 (FIG. 3) that bisects not only the body portion 26 but also the spout 28, the handle 30 and the two nipples straddling the handle 30.

Thus, what is provided is a blow molded container 24 having an angulated threaded spout 28, handle 30 and a pair of nipples all located on the top section of the rectangular container body 26. This top section, which is identified by reference numeral 68 in FIG. 3, is further designed by fabarication of the cavities 46 and 48 to include an angulated sloping shoulder 70 which terminates in a flat section 72. The sloping shoulder 70 forms the wall from which the threaded spout 28 extends while the flat section 72 forms a horizontal upper wall portion from which the nipple 32 projects vertically upward. The handle 30 is formed by two angulated side portions 74 and 76 as well as an upper flat portion 78. An open region 80 is provided under the flat portion 78 so that the container 24 can easily be gripped and carried by hand. Adjacent the handle 30 on the other side of the nipple 32, there is another upper horizontal wall portion 82 from which the nipple 34 extends. All of these elements are included between upper rear and front wall sections 84 and 86 which slope inwardly toward the top of the container. A generally vertical rear side wall 88 extends downwardly from the horizontal wall portion 82 as shown in FIG. 5.

Figure 4:
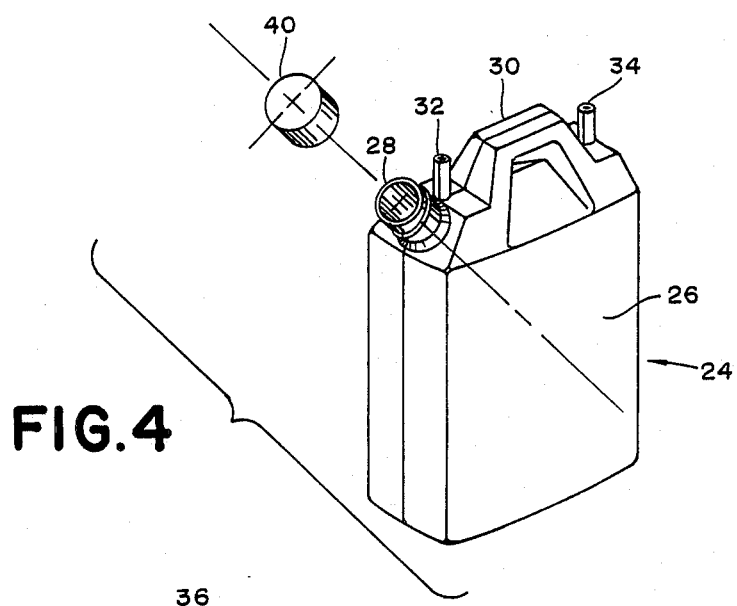
FIG. 4 is another tri-metric view of the container shown in FIG. 3 with a cap in exploded relationship therewith.
Figure 5:
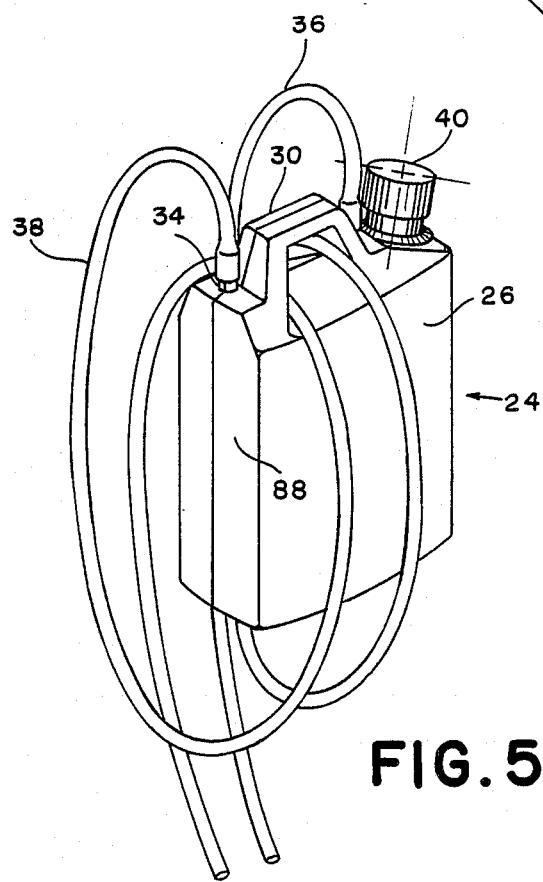
FIG.5 is yet another tri-metric view of the container shown in FIG. 1 with a pair of flexible hoses attached thereto and illustrates an assembled unit ready for use.

A plastic container configured in this manner can be fabricated easily and cheaply and can readily be mass produced, resulting in a relatively simple and inexpensive piece of apparatus when combined with a threaded plastic cap 40 as shown in FIG. 4 and a pair of plastic hoses as further shown in FIG. 5.

Although it is also possible to blow mold nipples on the surface of the container perpendicular to the die set parting surface, such a configuration would defeat the intended purpose of the invention due to the fact that the siphoned fluid would be directed across the container interior and would splatter in every direction. The present invention, however, directs the liquid flow down to the bottom of the container so that air being evacuated by the vacuum hose remains free from any liquid infusion into the vacuum source, i.e. the internal combustion engine.

Thus, what has been shown and described is a blow molded plastic siphoning container having all of the outwardly projecting elements, i.e. nipples, handle and pouring spout, located on the upper end of the container along the parting line between symmetrical halves thereof.

Having thus shown and described what is considered to be the preferred embodiment of the invention, it should be noted that the same has been made by way of illustration and not limitation. Accordingly, all modifications, alterations and changes coming within the spirit and scope of the invention as defined by the claims following this specification are herein meant to be included.

I claim:

1. Vacuum powered apparatus for selectively withdrawing oil from the crank case of a motor vehicle or transmission fluid from the automatic transmission housing of a motor vehicle comprising, a plastic container of unitized construction having a generally rectangular shape, one end of said container having a sloping shoulder wall section, a pour spout integrally formed on said sloping wall section, a threaded neck portion formed on said pouring spout, a threaded cap adapted to be connected to said neck portion to provide a vacuum tight closure, a pair of substantially flat horizontal wall portions formed on said one end of said container above said sloping shoulder wall section, a hose nipple integrally formed on each of said flat horizontal wall portions extending outwardly therefrom and communicating with the interior of said container, a handle integrally formed on said one end of said container and positioned between said nipples, a pair of elongated, transparent, flexible plastic hoses, one end of each hose being press-fitted onto said nipples, the opposite end of one of said hoses being coupled to the intake manifold of the motor vehicle engine, the opposite end of the other of said hoses being selectively inserted into the vehicle crank case or automatic transmission housing, whereby with the vehicle engine continuously running, a vacuum is applied to the interior of the container via the hose coupled to the intake manifold, thereby causing the oil or transmission fluid to be siphoned from the crank case or transmission housing to said container.

2. Vacuum powered apparatus according to claim 1, wherein the crank case and automatic transmission housing are each provided with a dip-stick tube, the opposite end of the other of said hoses being inserted in a selected one of the dipstick tubes.

* * * * *